US006608222B2

(12) United States Patent
Bonsignore et al.

(10) Patent No.: US 6,608,222 B2
(45) Date of Patent: Aug. 19, 2003

(54) BIOACTIVE CONJUGATED LINOLEIC ACID GLYCERIDES AND METHOD OF USE

(75) Inventors: Patrick V. Bonsignore, Channahon, IL (US); Michael H. Gurin, Glenview, IL (US)

(73) Assignee: Alpha Food Ingredients, Inc., Northfield, IL (US)

( * ) Notice: Subject to any disclaimer, the term of this patent is extended or adjusted under 35 U.S.C. 154(b) by 0 days.

(21) Appl. No.: 10/001,413

(22) Filed: Nov. 21, 2001

(65) Prior Publication Data

US 2002/0147356 A1 Oct. 10, 2002

Related U.S. Application Data

(60) Provisional application No. 60/252,382, filed on Nov. 21, 2000, provisional application No. 60/250,359, filed on Dec. 1, 2000, and provisional application No. 60/254,317, filed on Dec. 11, 2000.

(51) Int. Cl.⁷ .................................................. C11C 3/14
(52) U.S. Cl. ...................... 554/126; 514/560; 424/442; 424/451; 426/807
(58) Field of Search ........................... 554/126; 514/560

(56) References Cited

U.S. PATENT DOCUMENTS 6,413,545 B1 * 7/2002 Alviar et al. ................ 424/451

* cited by examiner

*Primary Examiner*—Deborah D. Carr
(74) *Attorney, Agent, or Firm*—David G. Rosenbaum; Rosenbaum & Associates, P.C.

(57) ABSTRACT

A composition and method for supplementing feed, nutrition and diet systems with bioactive glycerides of conjugated linoleic acid comprised of a synergistic blend of conjugated linoleic bioactive isomers acid in mono-, di-, and/or triglyceride form. The composition comprises (A) bioactive glycerides of conjugated linoleic acid comprised of a synergistic blend of conjugated linoleic bioactive isomers acid in mono-, di- and/or triglyceride form, (B) a carrier medium, and (C) a delivery system as a dietary supplement. The composition provides an effective increase in nutritional, therapeutic, and pharmacological properties in nutrition and diet systems.

16 Claims, No Drawings

BIOACTIVE CONJUGATED LINOLEIC ACID GLYCERIDES AND METHOD OF USE

CROSS-REFERENCE TO RELATED APPLICATIONS

This application claims priority from U.S. Provisional Patent Application Ser. No. 60/252,382 filed Nov. 21, 2000, U.S. Provisional Patent Application Ser. No. 60/250,359 filed Dec. 1, 2000, and U.S. Provisional Patent Application Ser. No. 60/254,317 filed Dec. 11, 2000.

BACKGROUND OF THE INVENTION

The present invention relates to the field of human and animal nutrition, and in particular to nutritional compositions containing bioactive glycerides of conjugated linoleic acid (BG-CLA).

Conjugated linoleic acid (CLA), generally understood as a family of positional and geometric isomers of linoleic acid (cis-9, cis-12-octadecadienoic acid), has been and is the focus of numerous research programs that seek to capitalize on its nutritional, therapeutic, and pharmacological properties. However the biological activity associated with CLA is diverse and complex and past testing has generated claims that are diametrically opposed to each other in terms of the active biologic isomer. The potential beneficial effects of CLA supplementation are apparent. Several criteria have been used for selecting CLA compositions for specific applications. The factors of significance have centered on the inclusion of a specific bioactive isomer or multiple bioactive isomers in a defined isomeric ratio. Other factors that affect the feasibility and performance of CLA isomers' composition include ingredient cost, toxicity, taste, and effect on subject within the diet.

CLA has been incorporated into the diet in liquid, gel or powdered forms, though the preferred method of administration is generally oral. The CLA has also been formulated with suitable carriers such as starch, sucrose or lactose in tablets, capsules, solutions and emulsions. CLA preparations are also provided as supplements in various prepared food products. A wide range of existing applications where CLA is directly incorporated into prepared food products includes diet products (diet drinks, diet bars and prepared frozen meals) and non-diet products (candy, snack products such as chips, prepared meat products, milk, cheese, yogurt and any other fat or oil containing foods).

Currently, most CLA manufactured is by the aikali isomerization process. The reaction product obtained from these processes is a mixture of CLA, linoleic acid and the other fatty acids found in the source oil. Generally, the amount of CLA derived from alkali isomerization of safflower oil is about 60% of the total free fatty acid product. Another method of producing a preparation consisting of primarily cis-9, trans-11 CLA is where linoleic acid is incubated with the microorganism *Butyrivibrio fibrisolvens*.

CLA is also naturally obtained in tall oil, a by-product of the kraft paper process. Further refining of tall oil results in a CLA enriched Modified Tall Oil (MTO) as incorporated herein by reference to U.S. Pat. No. 6,020,377 titled "Modified tall oil supplemented diet for growing-finishing pigs". Because of the huge output of tall oil in the paper industry each year, MTO could be readily available and very inexpensive. MTO however provides the CLA in the free fatty acid form and not the triglyceride form.

As an alternate to alkaline saponification and re-esterification with glycerin, it is possible to catalytically isomerize high linoleic acid triglyceride "LA-TG" (non-conjugated) oils directly into triglyceride oil containing a significantly higher percentage of conjugated linoleic acid triglycerides "CLA-TG". Again the early work (1950–1960) was directed toward improving drying oils by increasing the conjugated double bond content of normal non-conjugated di- and poly-unsaturated oils (triglyceride forms).

Early work demonstrated that nickel metal deposited on activated carbon (Ni/C) could be an effective isomerization catalyst for converting the non-conjugated double bond system of the linoleic acid groupings of vegetable oil triglycerides (at least partially) into a conjugated double bond system. J. C. Cowan, et al. *Ind. Eng. Chem.* 40:997–1002 (1946). Cowan, et al. demonstrated that conjugation could be induced to the extent of about 30% in high LA-TG vegetable oils, mainly soybean and linseed oils. It was interesting to note that the action of Ni/C on dehydrate castor oil "DCO" could increase conjugated diene content from a starting 30% CLA-TG content to a significantly higher 39% value.

Although safflower oil was not included in Cowan's original study, another study did concentrate on safflower oil (JAOCS, July 1948 page 237). Anthraquinone (AQ) was found to be a more effective isomerization catalyst as compared to Ni/C in this study. Whereas the action of Ni/C on safflower oil resulted in about 12–15% conjugation, AQ consistently brought conjugation up to about 25%. Early studies (1946 and 1948) did not spell out the resulting structure of the CLA-TG due to their only interest being the conjugated diene content as a reflection of the drying oil efficiency. The fact that high LA-TG's were the starting materials naturally implies that isomerization would lead to conjugated LA (i.e., CLA-TG) groupings in the final conjugated diene structures.

Alternative prior art methods and processes utilizing or creating conjugated linoleic acid differ from the invention. The U.S. Pat. No. 6,060,514 titled "Isomer enriched conjugated linoleic acid compositions" utilizes a Diels-Alder reaction method to obtain an acrylic adduct. The U.S. Pat. No. 6,042,869 titled "Bulk animal feeds containing conjugated linoleic acid" and U.S. Pat. No. 6,015,833 titled "Conjugated linoleic acid compositions" both utilize an alkaline saponification method to obtain conjugated linoleic acid in the free fatty acid form. The U.S. Pat. No. 5,892,074 titled "Synthesis of conjugated linoleic acid (CLA)" utilizes an expensive tosylate procedure to obtain conjugated linoleic acid. Lastly, the U.S. Pat. No. 5,719,301 titled "Method of conjugating double bonds in drying oils" utilizes a ruthenium compound as an isomerization catalyst to maximize the conjugation of both linoleic and linolenic acids for drying oil applications in the wood bonding industry. The choice of linseed oil as the preferred organic compound is indicative of its intent to maximize conjugation, due to the preferential conjugation of linolenic acid's three double bonds as compared to linoleic acid's two double bonds.

CLA is historically an expensive product with conclusive health and nutritional benefits. One mechanism whereby CLA reduces body fat is by enhancing insulin sensitivity so that fatty acids and glucose can pass through muscle cell membranes and away from fat tissue. CLA may help block fat cells that are in the body from filling up with fat. CLA also may have some effect on skeletal muscle, possibly stimulating muscle growth and fat burning. CLA inhibits the body's mechanism for storing fat and causes the body to utilize fatty reserves for energy. CLA also increases hormone sensitive lipase activity. This is an enzyme that breaks down fats stored in fat cells on the body. The fatty acids are returned to the blood stream to be used by muscle cells as an energy source. CLA has been shown to inhibit lipoprotein lipase. This is an enzyme that breaks down fat globules in the blood so that adipocyte (fat cell) uptake (body fat accumulation) can occur. The inhibition of lipoprotein lipase results in reduced fat deposition. CLA also has powerful antioxidant properties. It has been proposed that adding CLA to foods may prevent mold growth and oxidation. Thus, it is likely that the basis for the effect of CLA is an inhibition of lipid filling or an increase in lipid mobilization.

Another alternative method to achieve comparable benefits in feed efficiency of animals, dietary supplements for optimal weight gain and lean tissue of animals, nutritional benefits in human consumption as dietary supplements is L-carnitine. Work has been performed with Carnitine to achieve certain of these results and varying degrees of success have been achieved. Carnitine is chemically termed 3-hydrosy-4-N-trimethylamine butyric acid, and is similar to choline and a close cousin to amino acids. Unlike amino acids, Carnitine is not used for protein synthesis. Only the L-isomer of Carnitine is biologically active.

Carnitine is essential in the metabolism and movement of fatty acids within and between cells. The effect of carnitine on fatty acid metabolism seems to be limited to fatty acids with chain lengths greater than C8. Currently, L-carnitine is manufactured in four principal forms for human consumption that are L-carnitine as a free base, L-carnitine-L-tartrate, L-carnitine magnesium citrate, acetyl-L-carnitine, and L-carnitine applied to an inert food grade carrier (that is free-flowing, non-hygroscopic, and readily miscible). Crystalline L-carnitine L-tartrate is the salt of L-carnitine free-base with natural tartaric acid. It is a stable salt of natural tartaric acid and L-carnitine free-base. L-carnitine magnesium citrate is a granulated powder that contains magnesium ions, citrate and L-carnitine. Acetyl-L-carnitine is an ester of L-carnitine.

L-carnitine is also historically an expensive product with conclusive health and nutritional benefits. To meet daily energy requirements, the body primarily utilizes fatty acids and carbohydrates. In order for fatty acids to be used for energy, they must first be transported from outside a cell (the cytosol side) to inside a cell (the mitochondria). Carnitine is the vehicle that transports these fats. Once transported inside the mitochondria, these fatty acids are broken down through a process called beta-oxidation.

The prior art establishes two distinct and separate methods to increase feed efficiency, weight gain, and lean tissue of animals. The first is the use of CLA and the second is L-carnitine. Each of these methods achieves their respective results from distinct mechanisms. L-carnitine acts as a shuttle molecule, transporting fatty acids into the mitochondria. One mechanism whereby CLA reduces body fat is by enhancing insulin sensitivity so that fatty acids and glucose can pass through muscle cell membranes and away from fat tissue.

The notion of a L-carnitine as a synergistic supplement with conjugated linoleic acid for the enhanced effectiveness of CLA and L-carnitine is absent from the prior art. None of the prior references utilize the superior composition of L-carnitine and CLA.

The patent literature is void of the utilization of directly bioactive glycerides of conjugated linoleic acid, hereinafter referred to as "BG-CLA" as a feed additive to provide an effective source of "conjugated linoleic acid", hereinafter referred to as "CLA". Research literature is also absent of the presence of BG-CLA in animal or human diets or BG-CLA as a source for CLA. The notion of utilizing BG-CLA directly as a feed additive is also absent from the patent and research literature. A rapid and economical process for the conjugation of linoleic acid from vegetable oils is desirable in order to achieve conjugation levels above 30% for the purpose of human and animal nutrition without the intermediacy of alkaline saponification of the triglycerides.

The patent literature is void of the utilization of dehydrated castor oil, hereinafter referred to as "DCO" as a feed additive to provide an effective source of "conjugated linoleic acid", hereinafter referred to as "CLA" as verified by keyword text search of ("dehydrated castor oil" or DCO) & ("conjugated linoleic acid" or CLA). Research literature is also absent of the presence of DCO in animal or human diets or DCO as a source for CLA. The notion of isolating CLA from DCO or utilizing DCO directly as a feed additive is also absent from the patent and research literature.

The patent literature is void of the utilization of directly isomerized vegetable oils, hereinafter referred to as "IVO" as a feed additive to provide an effective source of "conjugated linoleic acid", hereinafter referred to as "CLA". Research literature is also absent of the presence of IVO in animal or human diets or IVO as a source for CLA. The notion of isolating CLA from IVO or utilizing IVO directly as a feed additive is also absent from the patent and research literature. A rapid and economical process for the conjugation of linoleic acid from vegetable oils is desirable in order to achieve conjugation levels above 30% for the purpose of human and animal nutrition without the intermediacy of alkaline saponification of the triglycerides.

The patent literature is void of the utilization of synergistic combinations of esterified conjugated linoleic acid mono-, di-, and tri-glycerides, hereinafter referred to as "ECG", derived from inexpensive feed sources of conjugated linoleic acid free fatty acids (CLA-FFA) as a feed additive to provide an effective source of "conjugated linoleic acid", hereinafter referred to as "CLA". Research literature is also absent of the presence of ECG in animal or human diets or ECG as a source for CLA. The notion of isolating CLA in all of its glyceride forms from ECG or utilizing ECG directly as a feed additive is also absent from the patent and research literature. A rapid and economical process for obtaining a synergistic mixture of esters and isomers of conjugated linoleic acid is desirable in order to achieve conjugation levels above 30% in the preferred glyceride form for the purpose of human and animal nutrition from inexpensive feedstock.

The present invention provides a new, optimal and low cost diet composition and method of use, which achieves superior performance over the above-referenced prior art, and others.

SUMMARY OF THE INVENTION

In accordance with one aspect of the present invention, bioactive glycerides of conjugated linoleic acid are provided. In accordance with another aspect of the present invention, bioactive glycerides of conjugated linoleic acid with low levels of linolenic acid are provided to reduce rancidity. A process for isolating the non-active CLA isomers and other non-conjugated components is provided. The process includes isolation of individual and groupings of isomers and non-conjugated components and addition to the composition additional levels of the bioactive glycerides of conjugated linoleic acid. In accordance with another aspect of the present invention, a process of modifying the ratio of bioactive glycerides of conjugated linoleic acid is provided. The process includes supplementing the derived bioactive glycerides of conjugated linoleic acid with prior isolated bioactive glycerides. A human and animal nutrition composition is also provided that consists generally of bioactive glycerides of conjugated linoleic acid (mono-, di-, and tri-glycerides) and an edible carrier.

An advantage of the present invention is that the full range of bioactive glycerides is present for the more effective probiotic effects in a wide variety of nutritional, therapeutic and pharmacological applications. Bioactive glycerides of conjugated linoleic acid increases fat firmness and improves meat quality in animals. Bioactive glycerides isomers of conjugated linoleic acid increase the effectiveness and uptake of CLA into animal meat. Moreover, the inventive bioactive glycerides of conjugated linoleic acid are label friendly under current the current regulatory schema for food products as "modified vegetable oil" for food, feed, and dietary supplements. Another specific advantage of the present invention is a cost effective delivery of CLA by reducing the effective cost of CLA needed to achieve the desired probiotic effects.

In accordance with another aspect of the present invention, the bioactive glycerides of conjugated linoleic acid composition are derived from dehydrated castor oil (DCO), having a desirable unsaturated fatty acid profile in the triglyceride (TG) form. DCO enhances the composition of animal feeds, human diet, pharmaceuticals and nutraceuticals for cost effective delivery of CLA-TG. The present invention permits altering the ratio of conjugated to non-conjugated components by catalysis of DCO to increase the ratio of conjugated isomers to non-conjugated isomers. The process may include reconverting the FFA of saponified DCO into triglycerides (TG), diglycerides (DG), and monoglycerides (MG) of DCO or esterification of free fatty acids into the desired TG, DG, and MG by catalyzed esterification with glycerine.

In accordance with another aspect of the present invention, the bioactive glycerides of conjugated linoleic acid composition are derived from a vegetable oil catalytically isomerized and an edible carrier. A vegetable oil is catalytically isomerized to yield a high linoleic acid content and maximize production of conjugated linoleic acid. Vegetable oils suitable for isomerization include, without limitation, safflower, soybean, sunflower, fish, corn, perilla and cotton-seed oil. Catalytic isomerization of vegetable oil conjugates methylene interrupted, di- and poly-unsaturated organic compounds and yields an isomerized vegetable oil comprised of conjugated linoleic acid in the desirable triglyceride form.

Another advantage of the present invention is that linoleic acid remains in the triglyceride form throughout the isomerization process, thus not requiring the re-esterificafion with glycerine common with the alkaline saponification process. Another aspect of the present invention, the bioactive glycerides of conjugated linoleic acid composition is derived from a conjugated linoleic acid fatty acid source esterified into conjugated linoleic acid mono-, di-, and tri-glycerides and an edible carrier. The conjugated linoleic acid fatty acid source may be esterified into conjugated linoleic acid mono-, di-, and tri-glycerides in order to enhance probiotic effects of conjugated linoleic acid and minimize negative effects of conjugated linoleic acid in the free fatty acid form. The conjugated linoleic free fatty acid sources that may be esterified include, without limitation, dehydrated castor oil fatty acid, modified tall oil, and saponified safflower, soybean, sunflower, linseed, fish, corn, perilla, cottonseed oils and other oils having high content of conjugated linoleic acid fatty acid. In accordance with another aspect of the present invention, a conjugated linoleic acid fatty acid source with a low level of linolenic acid is esterified into conjugated linoleic acid mono-, di-, and tri-glycerides is provided to reduce rancidity.

In accordance with yet another aspect of the present invention, a glycerol esterification process is utilized to obtain a synergistic blend of conjugated linoleic acid mono-, di-, and tri-glycerides compounds. The conjugated linoleic acid fatty acid source with monoglyceride as pancreatic lipase is 1,3-specific 2-acylmonoglycerides is the most readily absorbed. One advantage of the present invention is the synergistic combinations of esterified conjugated linoleic acid mono-, di-, and tri-glycerides comprises conjugated linoleic acid all in the desirable glyceride form. Mono- and di-glycerides maximize the emulsification of complex ingredients to greatly increase the surface area of fat that in turn makes it available for digestion by lipases and require less enzymatic digestion, as compared to triglycerides, to yield monoglyceride and fatty acids, both of which can efficiently diffuse into the enterocyte.

Another advantage of the present invention is that linoleic acid remains in the glyceride form throughout the isomerization process, thus not requiring the re-esterification with glycerine common with the alkaline saponification process. In accordance with another aspect of the present invention, the bioactive glycerides of conjugated linoleic acid composition is comprised of another synergistic bioactive agent including a L-carnitine Blend and an edible carrier.

Another aspect of the present invention, a BG-CLA-L-carnitine Blend is provided. The BG-CLA-L-carnitine Blend includes bioactive glycerides conjugated linoleic acid component and a L-carnitine component. In accordance with yet another aspect of the present invention, a L-carnitine component selected from the group of L-carnitine as a free-base, L-carnitine-L-tartrate, L-carnitine magnesium citrate and Acetyl-L-carnitine. One advantage of the BG-CLA-L-carnitine Blend is that the performance of the blend is superior to the performance of the individual components by acting synergistically amongst the bioactive components. Another advantage of the BG-CLA-L-carnitine Blend when utilized in animal feeds is the increased efficiency of feed conversion into lean body weight. A yet further advantage of the BG-CLA-L-carnitine Blend is the increase in fat firmness and improvement of meat quality in animals. A still further advantage of the BG-CLA-L-carnitine Blend is an increase in the effectiveness of CLA and uptake of CLA into resulting animal meat. Other advantages of the BG-CLA-L-carnitine Blend result in more cost effective delivery of CLA by reducing the effective amount of CLA needed to achieve the desired probiotic effects.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

DETAILED DESCRIPTION OF THE PREFERRED EMBODIMENTS

Bioactive glycerides of conjugated linoleic acid composition are provided that enhance the cost effectiveness of conjugated linoleic acid (CLA) delivery systems.

The composition is preferably comprised of bioactive glycerides of conjugated linoleic acid consisting of triglycerides, monoglycerides and diglycerides. The preferred bioactive glycerides of conjugated linoleic acid component is influenced by a number of factors, including cost effectiveness, fat content in diet, dispersion and settling characteristics, addition of glycerin and emulsion characteristics. More preferred bioactive isomers of CLA include the bioactive isomers of cis-9, trans-11 and trans-10, cis-12 in the glyceride form.

The scientific literature suggests that the active CLA isomers are c9, t11 and t10, c12 isomers with conflicting evidence within the application of animal feed supplement. BG-CLA in the triglyceride form eliminates the negative feed intake characteristics associated with the CLA in the free fatty acid form, thus greatly reducing the otherwise known requirement of specific ratio between the two bioactive isomers. Therefore, it is an object of the present invention to provide BG-CLA compositions containing CLA isomers exclusively in the glyceride form. It is also an object of the present invention to provide methods for using BG-CLA compositions containing CLA in the glyceride form in biologically favorable ratios, and of biologically active isomers in enriched content for optimization of the desired biological effects. The BG-CLA provides a CLA glycerides delivery system that meets the requirement of an isomeric mixture of conjugated linoleic acid but not pure cis-9, trans-11-octadecadienoic acid to act synergistically with the other CLA isomers to exert its biological effects.

Structured lipids can also be formed, by combining glycerol and fatty acids into a triglyceride, using esterification. Triglycerides are lipids that are made by esterification of glycerine (a triol) with fatty acids. The products comprise an equilibrium mixture of the monoglycerides, diglycerides and triglycerides in the esterification reaction of fatty acids with glycerin. Since BG-CLA is the preferred approach to the incorporation of biologically active CLA into animal and human feed diets, direct access to BG-CLA is afforded by the dehydration of castor oil into DCO or by the catalyzed isomerization of high linoleic fats and oils, especially safflower oil. Alternately, enriched CLA in the free fatty acid (FFA) form, available by alkaline saponification, digestive isomerization and reacidification of high linoleic acid fats and oils (safflower and even DCO), can be re-esterified into the desired triglyceride form (CLA-TG) by conventional acid catalyzed esterification with glycerine. The esterification of free fatty acids (usually the polyunsaturated types and more specifically the isomerized linseed oil fatty acids with polyhydroxy compounds such as glycerin) is well known and practiced in the manufacture of improved "drying oil" vehicles for the oil based paint industry (See e.g., M. W. Formo, *Industrial Fatty Acids,* E. S. Pattison, Ed. Chapter 6, Reinhold N.Y. 1959).

The BG-CLA composition is preferably comprised of an esterified conjugated glycerides further comprised of conjugated linoleic acid in the triglyceride form, monoglyceride form and diglyceride form. The preferred esterified conjugated glycerides component is influenced by a number of factors, including cost effectiveness, fat content in diet, dispersion and settling characteristics, addition of glycerin and emulsion characteristics. Preferred BG-CLA components have CLA in the glyceride form.

More preferred BG-CLA components are with the bioactive isomers of cis-9, trans-11 and trans-10, cis-12. Particularly preferred BG-CLA components are in the synergistic combination of monoglycerides, diglycerides, and triglycerides form with the bioactive isomers of cis-9, trans-11 and trans-10, cis-12. More specifically preferred CLA components are in the 2-monoglyceride form with the bioactive isomers of cis-9, trans-11 and trans-10, cis-12.

The compositions of the present invention are preferably formulated by combining dehydrated castor oil (DCO) into human food supplements and animal feeds. The term DCO is meant in the context of this invention to include: a dehydrated castor oil derivative component consisting essentially of bioactive isomers of conjugated linoleic acid in the triglyceride form; a dehydrated castor oil derivative component consisting essentially of bioactive isomers of conjugated linoleic acid in the triglyceride form further enriched with a specific bioactive isomer of conjugated linoleic acid; and a dehydrated castor oil derivative component consisting essentially of bioactive isomers of conjugated linoleic acid in the triglyceride form further refined to remove specific non-bioactive components present in dehydrated castor oil.

DCO has a desirable unsaturated fatty acid profile that can be added in small amounts to the normal diet to yield numerous significant benefits attributed to its superior delivery method of conjugated linoleic acid (CLA) in the triglyceride (TG) form. DCO is the dehydration product of castor oil (the high [85–88%) ricinoleic acid ester of glycerine). DCO, derived from castor oil, comes mainly from India and from Brazil. The present price in the United States is circa 75 cents/lb. Note that the CLA of DCO is already in the TG form. The structure of the ricinoleic acid grouping of castor oil derives from 12-hydroxy-cis-9-octadecenoic acid. Because of the significant demand in the paint industry each year, DCO is readily available and very inexpensive.

According to the method of the present invention, castor oil, consisting predominantly of ricinoleic acid triglyceride (85–88%) is subjected to dehydration conditions (ricinoleic acid 12-hydroxy, cis-9-octadecenoic acid). Dehydration converts or transforms the ricinoleic acid grouping contained in the oil into conjugated linoleic acid triglyceride (CLA-TG) along with a relatively high proportion of non-conjugated linoleic acid triglyceride (LA-TG). Typically the ratio of CLA-TG to LA-TG is in the range of 1:2 to 1:3.

Both triglyceride esters of CLA and normal LA are co-produced during the dehydration of castor oil. The CLA-TG has a much faster drying rate than does the LA-TG, hence the early efforts to maximize DCO's CLA-TG content. Chemically, the dehydration of castor oil (acid catalyzed) involves removal of the hydroxyl group and hydrogen from an adjacent carbon atom in the ricinoleic portion of the triglyceride. Since the hydroxyl group is in the 12 position, the adjacent hydrogen can come from either the 11 or 13 position (traditional numbering of right to left with carbon atom 1 as the carboxylic acid carbon atom) $CH_3-(CH_2)_4-CH_2-CHOH-CH_2-CH=CH-(CH_2)_7-CO_2$-glycerine group residue. If the H comes from the 11 position, the double bond formed at the 11–12 position results in a CLA. If the H comes from the 13 position, the resulting di-unsaturated fatty acid grouping is that of linoleic acid (LA), the non-conjugated diene isomer (i.e., 9,12-octadecadienoic acid). According to R. T. Terrill [JAOCS 27, 477 (1950)], the approximate fatty acid composition for dehydrated castor oil (DCO) in the triglyceride form is illustrated in Table A.

TABLE A

Chemical Makeup of Dehydrated Castor Oil

| Fatty Acid | Weight % |
| --- | --- |
| 9,11-octadecadienoic Acid (CLA) | 22% |
| 9,12-octadecadienoic Acid (LA) | 65% |
| 9-octadecenoic Acid (Oleic Acid) | 7.5% |
| 12-hydroxy-9-octadecenoic Acid (Ricinoleic Acid) | ca. 5% |

The dehydration of castor oil is never complete and some residual "castor oil" invariably remains, generally less than 5%. Its removal, if necessary, is achieved easily since castor oil is soluble in methyl alcohol while the other components are not.

The CLA currently under study as the free fatty acids (FFA) can have a variety of geometric configurations including cis-9, trans-11; c-9, c-11; t-9, c-11; and t-9, t-11. There is a decided bias in the literature toward attributing the highest biological activity to the cis-9, trans-11 isomer of CLA. The major portion of the CLA-TG groupings within DCO is cis-9, trans-11 isomer of CLA. There is considerable evidence that DCO contains the full spectrum of geometric isomers although the cis-9, trans-11 isomer is dominant. Some bond migration from the 9 position occurs and that the 10,12-octadecadienoic acid configuration is also present. A recent paper [V. Gavino et al., *J. Nutrition* 130:27–29 (2000)] notes that in feeding studies with hamsters, purified c-9, t-11 CLA-FFA was not so biologically active as a composite group of CLA-FFA isomers. They note the "c-9, t-11 may need to act synergistically with the other CLA isomers to exert its biological effects". Therefore, the full complement of CLA-TG isomers, both geometrical and positional, in DCO insures a composite of maximum probiotic efficacy.

The present invention does not preclude the reduction or elimination of specific components of DCO such as non-dehydrated castor oil using alcohol separation techniques or other known separation techniques. The present invention does not preclude the addition of further supplements including known bioactive isomers of CLA to alter the desired ratio between the isomers themselves. Furthermore, the present invention does not preclude the known techniques to increase the CLA content in the DCO in order to reduce the total volume requirements to meet the desired total CLA content. The isomer composition of the various CLA preparations may preferably be confirmed by gas chromatography, as is known in the art.

Recently, preparative liquid chromatography (LC) has received considerable attention for component separation, particularly when it has been applied to valuable pharmaceutical compounds. Although widely used for analytical purposes, elution chromatography in practical application is a batch process, and it is considered to be rather expensive for the large-scale preparation of organic compounds. The use of simulated moving bed chromatography to purify pharmaceutical was rediscovered in the early 1990s. The applications of simulated moving bed chromatography have expanded greatly with the advent of several commercial systems and it is now an established preparative technique for production-scale applications.

The compositions of the present invention are also preferably formulated by combining isomerized vegetable oil into human food supplements and animal feeds. The preferred isomerized vegetable oil is influenced by a number of factors, including cost effectiveness, effectiveness in achieving high conjugation levels, minimization of linolenic levels, dispersion and settling characteristics, and emulsion characteristics. Preferred vegetable oils have high linoleic acid triglycerides levels and low linolenic triglyceride levels. More preferred vegetable oils are selected from the group of safflower, soybean, sunflower, corn, perilla and cotton-seed oils. Particularly preferred vegetable oil is safflower oil with its high linoleic acid triglyceride (LA-TG) content (72–75%) and relatively low cost (as compared to other CLA sources) as a preferred source of linoleic acid triglyceride for subjection to catalytic isomerization.

The resulting isomerized vegetable oil will be in the preferred conjugated linoleic acid triglyceride form, with the total weight percentage as a function of the catalyst chosen and the reaction conditions (i.e., time and temperature). Anthraquinone, organo-ruthenium complexes, soluble ruthenium metal, ruthenium salts, ruthenium covalent compounds, rhodium/iridium, ruthenium on carbon, rhodium and ruthenium, and Nickel/Carbon are efficient catalysts, although many other catalysts are claimed such as sulfur dioxide, iodine in turpentine, quinones other than anthraquinone, etc.

More preferred fatty acids are selected from the group of dehydrated castor oil fatty acid, modified tall oil, and saponified safflower, soybean, sunflower, corn, perilla, cotton seed and linseed oils. Particularly preferred source of conjugated linoleic acid fatty acid is feed stock with high linoleic acid triglyceride (LA-TG) content and relatively low cost (as compared to other CLA sources) as a preferred source of conjugated linoleic acid fatty acid for subjection to glycerol esterification.

The compositions of the present invention are also preferably formulated by combining esterified conjugated glycerides further comprised of conjugated linoleic acid in the triglyceride, monoglyceride and diglyceride forms into human food supplements and animal feeds.

In the esterification products of vegetable oils, at first, the product from esterification of vegetable oil with glycerin may be used. The product comprises fatty acid triglycerides; mono-glycerides; mono- and di-glycerides; or a mixture thereof. Monoglycerides maximize the emulsification of complex ingredients. Emulsification is not digestion per se, but is of importance because it greatly increases the surface area of fat, making it available for digestion by lipases, which cannot access the inside of lipid droplets. In order for triglycerides to be absorbed, two processes must occur: a) large aggregates of triglyceride must be emulsified followed by b) enzymatic digestion to yield monoglycerides and fatty acids, both of which can efficiently diffuse into the enterocyte.

Hydrolysis of triglyceride (TG) into monoglyceride (MG) and free fatty acids is accomplished predominantly by pancreatic lipase. The activity of this enzyme is to clip the fatty acids at positions 1 and 3 of the TG, leaving two free fatty acids and a 2-monoglyceride. Shortly after a meal, lipase is present within the small intestine in rather huge quantities, but can act only on the surface of TG droplets. For a given volume of lipid, the smaller the droplet size, the greater the surface area, which means more lipase molecules can get to work.

Two major groups of lipases are known, and they are classified according to positional specificity. The first group is non-specific lipases, enzymes that can release free fatty acids from all 3 positions of glycerol and eventually resulting in the complete breakdown of the TG molecule into glycerol+3 fatty acids (FA). During the reaction, one may see intermediates such as (1,2), (2,3) or (1,3) as well as 1-, 2-, or 3-monoglycerides.

The second group is (1,3) specific lipases. These enzymes release FA only from the 1- and 3-positions of glycerol. The products of the reaction include 1,2-diglycerides and 2-monoglyceride. Note that 2-monoglycerides are normally unstable and can undergo acyl migration to form 1,3-diglycerides or 1-monoglycerides. These can then be attacked further by lipases. Upon prolonged incubation, the TG will be broken down to glycerol and 3 FA.

As monoglycerides and fatty acids are liberated through the action of lipase, they retain their association with bile salts and complex with other lipids to form structures called micelles. Micelles are essentially small aggregates of mixed lipids and bile salts suspended within the ingesta. As the ingesta is mixed, micelles bump into the brush border and the lipids, including monoglyceride and fatty acids, are absorbed.

Lipids are absorbed where fatty acids and 2-monoglycerides enter the enterocyte by simple diffusion across the plasma membrane. A considerable fraction of the fatty acids also enter the enterocyte via a specific fatty acid transporter protein in the membrane. Once inside the enterocyte, fatty acids and monoglyceride are transported into the endoplasmic reticulum, where they are used to synthesize triglyceride. Triglycerides cannot be efficiently absorbed, and are enzymatically digested by pancreatic lipase into a 2-monoglyceride and two free fatty acids, all of which can be absorbed.

However, it is not appropriate to make generalizations of all three positions of a fat, bearing in mind that the digestion and uptake of the fatty acids of the three positions can be markedly different. In particular, the 2-positional fatty acids as 2-monoglycerides derived from the action of pancreatic enzymes on oils and fats, being 1,3-specific, are the most easily absorbed. Remembering that the 1- and 3-positional fatty acids are liberated by the digestive enzymes (which are 1,3-specific), while the 2-monoglyceride remains and is most readily absorbed. Pancreatic lipase is 1,3-specific 2-acylmonoglycerides being well absorbed.

The local of the hydrolysis of monoglycerides is of interest. It can take place either in the intestinal lumen or after absorption. The earlier observation that approximately ⅔'s of ingested TG is absorbed as MG and the evidence presented here that 70–75% of ingested MG is hydrolyzed in order to produce TG suggests that the hydrolysis of MG is part of the mechanism of TG synthesis and takes place in the mucosa or at least after absorption. This point of view is also strengthened by the resistance of MG to the action of intestinal lipase and the strong evidence for the ready absorption of MG. Inside intestinal cells, triglycerides are resynthesized from glycerol and fatty acids and packaged into chylomicrons that are then transported by lymph system and dumped into blood. Only short-chain fatty acids are directly absorbed from small intestine into blood.

The compositions of the present invention are also preferably formulated by combining bioactive glycerides of conjugated linoleic acid (BG-CLA) and L-carnitine into human food supplements and animal feeds in order to achieve unexpected synergistic gains.

A human and animal nutrition composition comprised of BG-CLA and L-carnitine in combination with a dietary component or carrier has a number of advantages, including increased feed efficiency, while minimizing individual component levels and providing increased cost effectiveness.

The composition as an animal feed is preferably comprised of a BG-CLA component and a L-carnitine compo-nent. The BG-CLA component may be in the triglyceride form, monoglyceride form, diglyceride form, or free fatty acid form. The L-carnitine component may be in the form of L-carnitine as a free base, L-carnitine-L-tartrate, L-carnitine magnesium citrate, Acetyl-L-carnitine and L-carnitine in an inert food grade carrier.

The preferred L-carnitine component is influenced by a number of factors, including cost effectiveness, fat content in diet, dispersion and settling characteristics, and emulsion characteristics. Preferred L-carnitine components have L-carnitine in the form of L-carnitine magnesium citrate. The preferred ratio is from 500:1 to 50:1 for BG-CLA components to L-carnitine components. The more preferred ratio is 200:1 for BG-CLA components to L-carnitine components. The blend of CLA and L-carnitine is hereinafter known as "BG-CLA-L-carnitine Blend". The preferred ratio of BG-CLA-L-carnitine Blend to food composition as utilized in an animal feed diet is influenced by a number of factors, including cost effectiveness, fat content in diet, performance feed efficiency gains, and other probiotic effects. The preferred ratio is from 2:100 for BG-CLA-L-carnitine Blend to food components. The more preferred ratio is 1:200 for BG-CLA-L-carnitine Blend to food components. The preferred ratio of BG-CLA-L-carnitine Blend to total daily food consumption as utilized in an dietary supplement is influenced by a number of factors, including cost effectiveness, fat content in diet, performance feed efficiency gains, and other probiotic effects. The preferred ratio is from 2:100 for BG-CLA-L-carnitine Blend to total daily food consumption. The more preferred ratio is 1:200 for BG-CLA-L-carnitine Blend to total daily food consumption.

The uses of BG-CLA and L-carnitine individually have been well documented in the patent and scientific literature. These uses may be divided into two general categories. The first category is their use nutritionally as a dietary supplement. The second category is their therapeutic and pharmacological uses. The presence of multiple BG-CLA isomers and L-carnitine is superior to any individual isomer of BG-CLA, group of isomers of BG-CLA, or L-carnitine. In the present invention, the ratio of BG-CLA isomers to L-carnitine is less critical than the presence itself of both BG-CLA isomers and L-carnitine when added to human food supplements and animal feeds to provide desirable nutritional, therapeutic and pharmacological effects.

The BG-CLA-L-carnitine Blend is particularly useful in combination with animal feeds as a fat reducing mechanism that involves rejuvenating cell membranes in the muscles and connective tissues to allow fats to freely enter to produce energy and growth. The BG-CLA-L-carnitine Blend is also particularly useful in combination with human feeds as a fat reducing mechanism that involves rejuvenating cell membranes in the muscles and connective tissues to allow fats to freely enter to produce energy and growth.

A surprising feature of the BG-CLA composition is its effectiveness within diet and nutrition processes. There thus remains a need in the art for an enhanced CLA as derived from a BG-CLA composition that's suitable for a wide range of nutritional, therapeutic, and pharmacological delivery systems, over a wide range of operating conditions, that is non-toxic and compatible with present delivery systems. These and other needs are answered by the present invention, as hereinafter disclosed.

In an embodiment, the BG-CLA is utilized in animal feeds as a method to increase the efficiency of feed conversion into body weight varies significantly among different species of animals. Because feed is a relatively expensive cost factor in the production of food producing animals (50 to 70% of the cost of production), any improvement in the ability of the animal to convert feed into food products can directly improve the profitability of a food producer.

The preferred ratio of bioactive glycerides of conjugated linoleic acid to food composition as utilized in an animal feed diet is influenced by a number of factors, including percent of conjugation, cost effectiveness, fat content in diet, performance feed efficiency gains, and other probiotic effects. The preferred ratio is from 2:100 for bioactive glycerides of conjugated linoleic acid conjugated level component to food components. The more preferred ratio is 1:200 for bioactive glycerides of conjugated linoleic acid conjugated level component to food components. The preferred ratio of bioactive glycerides of conjugated linoleic acid conjugated level component to total daily food consumption as utilized in an dietary supplement is influenced by a number of factors, including cost effectiveness, fat content in diet, performance feed efficiency gains, and other probiotic effects. The preferred ratio is from 2:100 for bioactive glycerides of conjugated linoleic acid conjugated level component to total daily food consumption. The more preferred ratio is 1:200 for bioactive glycerides of conjugated linoleic acid conjugated level component to total daily food consumption.

BG-CLA is also susceptible to oxidation. Therefore it is desirable to package BG-CLA for human use with suitable antioxidants such as tocopherols, ascorbate, ascorbyl palmitate or spice extracts such as rosemary extract. Butylated-hydroxytoluene (BHT), a Generally Recognized As Safe (GRAS) product as a common preservative, is used in the food industry to slow the development of off-flavors, odors and color changes caused by oxidation, mostly in foods that are high in fats and oils. Butylated hydroxyanisole (BHA), propyl gallate, citric acid and mono-tertiary-butyl-hydroquinone (TBHQ) are also known antioxidants. Additionally, other herbs and spices, like cloves, rosemary, oregano, sage and vanilla, also have known antioxidant properties. They are not suitable as preservatives in fats meant for general use due to their strong odors, but will lend their protective properties in any recipes that calls for them. Oxygen is eight times more soluble in fats than in water and it is the oxidation resulting from this exposure that is the primary cause of rancidity. The more polyunsaturated a fat is and especially when that polyunsaturation is conjugated, the faster it will go rancid. This may not, at first, be readily apparent because vegetable oils have to become several times more rancid than animal fats before our noses can detect it. An extreme example of rancidity is the linseed oil (flaxseed) that we use as a wood finish and a base for oil paints. In just a matter of hours the oil oxidizes into a solid polymer. This is very desirable for wood and paint, very undesirable for food.

The uses of CLA have been well documented in the patent and scientific literature. These uses may be divided into two general categories. The first category is their use nutritionally as a dietary supplement. The second category is their therapeutic and pharmacological uses. The presence of multiple CLA isomers in the glyceride form is superior to any individual isomer of CLA or group of isomers of CLA in the free fatty acid form. In the present invention, the ratio of CLA isomers is less critical than the presence itself of both bioactive CLA isomers in the glyceride form when added to human food supplements and animal feeds to provide desirable nutritional, therapeutic and pharmacological effects.

The compositions of the present invention will have a variety of uses. These uses include: the reduction of body fat in animals; increasing muscle mass in animals; increasing feed efficiency in animals, reducing body weight in humans, attenuating allergic reactions in animals; preventing weight loss due to immune stimulation in animals; elevating CD-4 and CD-8 cell counts in animals; increasing the mineral content of bone in animals; preventing skeletal abnormalities in animals; and, decreasing the amount of cholesterol in the blood of animals. In each case, the term animal includes all mammals including humans.

The BG-CLA may be provided as a daily ration in a vehicle with a lipid component containing or comprising 0.01 to 10 gram equivalents of the bioactive isomers, most preferably 0.01 to 10 gram equivalents of the CLA in glyceride form. Gram equivalents means that the total amount of bioactive isomers provided, irrespective of other isomers present, is from 0.01 to 10 grams. When the BG-CLA is provided as part of a daily ration, the intake may occur in a single dose, or as a series of doses in a feed or various food products consumed throughout the day. The compositions of the present invention may also take the form of a bulk product for sale in commerce. The bulk BG-CLA product contains or comprises at least 25 percent conjugated linoleic acid isomers in the glyceride form. This bulk product may be diluted into nutritional products such as animal feeds, human dietary supplements, and human food products. Those products will be compositions containing or comprising BG-CLA isomers.

The BG-CLA may also be used in liquid, gel or powdered forms. The preferred method of administration is oral. The BG-CLA may be formulated with suitable carriers such as starch, sucrose or lactose in tablets, capsules, solutions and emulsions. The tablet or capsule of the present invention may be coated with an enteric coating that dissolves at a pH of about 6.0 to 7.0. A suitable enteric coating that dissolves in the small intestine but not in the stomach is cellulose acetate phthalate. The BG-CLA preparations may also be provided as supplements in various prepared food products.

For the purposes of this application, prepared food product means any natural, processed, diet or non-diet food product to which BG-CLA has been added. Therefore, BG-CLA may be directly incorporated into many prepared diet food products, including, but not limited to diet drinks, diet bars and prepared frozen meals. Furthermore, BG-CLA may be incorporated into many prepared non-diet products, including, but not limited to candy, snack products such as chips, prepared meat products, milk, cheese, yogurt and any other fat or oil containing foods.

The BG-CLA can be administered orally in amounts greater than about 0.05% of the diet by weight. The BG-CLA can also be administered parenterally in amounts greater than about 0.05% of the diet by weight. The method of the present invention may take other embodiments. For example, the BG-CLA can be administered to an animal in a pharmaceutical or veterinary composition, such as tablets, capsules, solutions or emulsions, containing a safe and effective dose of the BG-CLA. The BG-CLA may be formulated with suitable carriers such as grains, starch, sucrose or lactose, proteins, free fatty acids and other glycerides.

The bioactive glycerides of conjugated linoleic acid are particularly useful when incorporated into animal feed. Exemplary animal feeds include significant quantities of corn and soybean meal. Other suitable cereal grains included in the diets of the invention are wheat, sorghum, oat, canola, and barley. It is also possible to feed the supplements hereof separately from the solid feed, e.g., as a liquid directly fed or as an emulsion in water. However, in such cases it is preferable that the amount of BG-CLA fed be correlated with the amount of solid feed to achieve the best results. Bioactive glycerides of conjugated linoleic acid in combination with a dietary component or carrier has a number of advantages, including increased feed efficiency, while minimizing individual active component levels and providing increased cost effectiveness.

The method of the present invention may take other embodiments. Bioactive glycerides of conjugated linoleic acid are preferably suspended in a liquid, or as an emulsion in water. In such cases it is preferable that the amount of bioactive glycerides of conjugated linoleic acid fed be correlated with the amount of solid feed to achieve the best results. Such other liquids include glycerin, fatty acids and triglycerides emulsions in water. The addition of glycerin enables an equilibrium ration to be achieved of triglycerides, diglycerides, and monoglycerides to increase emulsion characteristics of the bioactive glycerides of conjugated linoleic acid. This liquid suspension may then be incorporated into the feed stock.

Alternatively bioactive glycerides of conjugated linoleic acid are incorporated into the diet in liquid, gel or powdered forms, though the preferred method of administration is generally oral to form an effective delivery system. The bioactive glycerides of conjugated linoleic acid are formulated with suitable carriers such as starch, sucrose or lactose, proteins, free fatty acids and other triglycerides in tablets, capsules, solutions and emulsions. The tablet or capsule of the present invention may be coated with an enteric coating that dissolves at a pH of about 6.0 to 7.0. A suitable enteric coating that dissolves in the small intestine but not in the stomach is cellulose acetate phthalate.

In another embodiment, the esterified conjugated glycerides are added to poultry feed thus comprising CLA-TG, CLA-MG, and CLA-DG and an unconjugated LA-TG to overcome the adverse effects of conjugated linoleic acid on an egg.

In yet another embodiment, the bioactive glycerides of conjugated linoleic acid are provided as a supplement in various prepared food products. Such other food products include diet products (diet drinks, diet bars and prepared frozen meals) and non-diet products (candy, snack products such as chips, prepared meat products, milk, cheese, yogurt and any other fat or oil containing foods). The concentrate of bioactive glycerides of conjugated linoleic acid may then be diluted with water to form an emulsion. Alternatively, the concentrate of bioactive glycerides of conjugated linoleic acid is diluted with either fatty acid or triglyceride oil to form an emulsion. Further, he concentrate of bioactive glycerides of conjugated linoleic acid may also be diluted with both water and fatty acid/triglyceride vegetable oils.

The bioactive glycerides of conjugated linoleic acid exhibit utility when used to attenuate allergic immune responses, in preventing weight loss and anorexia by immune stimulation, inhibit intravascular arteriosclerosis, provide antioxidant, anticarcinogen, and anticatabolic effects, as a fat reducing mechanism that involves promoting transmembrane migration of fats in muscular and connective tissue cell membranes, reduce levels of PGE2 (an inflammatory prostaglandin implicated in autoimmune diseases) mechanism, enhance tyrosine kinase activity in cancer cells which, when used with soy, the genistein fraction of soy specifically inhibits tyrosine kinase activity, maintain or increase CD-4 and CD-8 cell populations and thus to prevent or alleviate the adverse effects caused by the production or exogenous administration of tumor necrosis factor (TNF), as a fat mimetic, or to cyclo-oxygenase-catalyzed conversion of arachidonic acid, thromboxane formation and platelet aggregation.

Without intending to limit the scope of the invention, the following examples describe a method of forming and using the bioactive glycerides of conjugated linoleic acid of the present invention. Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims. All of the examples below are hereinafter referred to as group and known as bioactive glycerides of conjugated linoleic acid.

EXAMPLES

Example 1

Castor oil is dehydrated thereby yielding conjugated linoleic acid triglyceride.

Example 2

Castor oil is dehydrated then further catalyzed thereby yielding an increased weight percentage of conjugated linoleic acid triglyceride.

Example 3

DCO-FFA is esterified to increase the weight percentage of conjugated linoleic acid in triglyceride form when compared to non-esterified dehydrated castor oil triglyceride.

Example 4

DCO is compounded with 9,11 conjugated linoleic acid triglyceride to increase weight percentage of conjugated linoleic acid in triglyceride form as compared to traditional DCO-TG Example 5

DCO is compounded with 10,12 conjugated linoleic acid triglyceride to increase the weight percentage of conjugated linoleic acid in triglyceride form as compared to traditional DCO-TG Example 6

9,11 conjugated linoleic acid triglyceride and 10,12 conjugated linoleic acid triglyceride are separated from dehydrated castor oil and compounded to increase the weight percentage of conjugated linoleic acid in triglyceride form as compared to traditional DCO-TG Example 7

Bulk CLA-L-carnitine Blend is prepared with a 200:1 ratio of conjugated linoleic acid triglyceride having bioactive isomers of cis-9, trans-11 and trans-10, cis-12 to L-carnitine as a free base.

Example 8

An animal feed supplement is prepared having a 20,000:100:1 ratio of corn meal to conjugated linoleic acid triglyceride with bioactive isomers of cis-9, trans-11 and trans-10, cis-12 to L-carnitine as a free base.

Example 9

A bulk water emulsion is prepared having a 300:100:1 ratio of water to conjugated linoleic acid triglyceride with bioactive isomers of cis-9, trans-11 and trans-10, cis-12 to L-carnitine as a free base.

Example 10

Bulk isomerized vegetable oil comprising conjugated linoleic acid triglyceride with bioactive isomers of cis-9, trans-11 and trans-10, cis-12 units.

Example 11

A bulk isomerized vegetable oil is prepared having conjugated linoleic acid triglyceride with bioactive isomers of cis-9, trans-11 and trans-10, cis-12 units and is further compounded with 10,12 CLA-TG to increase the weight percentage of conjugated linoleic acid in 10,12 CLA-TG form as compared to traditional isomerized vegetable oil.

Example 12

An animal feed supplement is prepared having a 100:1 ratio of corn meal to isomerized vegetable oil having a bioactive component of conjugated linoleic acid triglyceride with bioactive isomers of cis-9, trans-11 and trans-10, cis-12 units. This is further supplemented with 10,12 CLA-TG to increase the weight percentage of conjugated linoleic acid in 10,12 CLA-TG form as compared to traditional isomerized vegetable oil.

Example 13

A bulk water emulsion is prepared with a 100:1 ratio of water to isomerized vegetable oil having a bioactive component of conjugated linoleic acid triglyceride with bioactive isomers of cis-9, trans-11 and trans-10, cis-12 and further supplemented with 10,12 CLA-TG to increase weight percentage of conjugated linoleic acid in 10,12 CLA-TG form as compared to traditional isomerized vegetable oil.

Example 14

A dietary supplement tablet is prepared from isomerized vegetable oil further having a bioactive conjugated linoleic acid triglyceride component with bioactive isomers of cis-9, trans-11 and trans-10, cis-12 unit and supplemented with 10,12 CLA-TG to increase weight percentage of conjugated linoleic acid in 10,12 CLA-TG form as compared to traditional isomerized vegetable oil and formed into a tablet with an inert carrier.

Example 15

A nutritional drink is formed by admixing 12 ounces of a fruit juice protein blend with 1.6 grams of isomerized vegetable oil having a primary bioactive conjugated linoleic acid triglyceride component with bioactive isomers of cis-9, trans-11 and trans-10 supplemented with 10,12 CLA-TG to increase weight percentage of conjugated linoleic acid in 10,12 CLA-TG form as compared to traditional isomerized vegetable oil.

Example 16

A bulk isolated conjugated linoleic acid triglyceride with bioactive isomers of cis-9, trans-11 and trans-10, cis-12 units is prepared from isomerized vegetable oil and supplemented with 10,12 CLA-TG to increase weight percentage of conjugated linoleic acid in 10,12 CLA-TG form as compared to traditional isomerized vegetable oil.

Example 17

An animal feed supplement is compounded from a 100:1 ratio of corn meal to isolated conjugated linoleic acid triglyceride having bioactive isomers of cis-9, trans-11 and trans-10, cis-12 units from isomerized vegetable oil supplemented with 10,12 CLA-TG to increase weight percentage of conjugated linoleic acid in 10,12 CLA-TG form as compared to traditional isomerized vegetable oil.

Example 18

A bulk water emulsion is prepared from a 100:1 ratio of water to isolated vegetable oil comprising conjugated linoleic acid triglyceride with bioactive isomers of cis-9, trans-11 and trans-10, cis-12 from isomerized vegetable oil and with 10,12 CLA-TG to increase weight percentage of conjugated linoleic acid in 10,12 CLA-TG form as compared to traditional isomerized vegetable oil.

Example 19

A dietary supplement tablet is prepared by compounding isolated conjugated linoleic acid triglyceride with bioactive isomers of cis-9, trans-11 and trans-10, cis-12 and further supplemented with 10,12 CLA-TG with inert carrier, to increase weight percentage of conjugated linoleic acid in 10,12 CLA-TG form as compared to traditional isomerized vegetable oil.

Example 20

A nutritional drink is prepared by admixing 12 ounces of a fruit juice-protein blend with 1.6 grams of isolated conjugated linoleic acid triglyceride having bioactive isomers of cis-9, trans-11 and trans-10 from isomerized vegetable oil supplemented with 10,12 CLA-TG to increase weight percentage of conjugated linoleic acid in 10,12 CLA-TG form as compared to traditional isomerized vegetable oil.

Example 21

Bulk esterified conjugated glycerides are prepared having conjugated linoleic acid glycerides with bioactive isomers of cis-9, trans-11 and trans-10, cis-12 units.

Example 22

An animal food supplement is prepared having a 100:1 ratio of corn meal to esterified conjugated glycerides comprising conjugated linoleic acid glycerides with bioactive isomers of cis-9, trans-11 and trans-10, cis-12 units.

Example 23

Bulk water emulsion comprised of 100:1 ratio of water to esterified conjugated glycerides comprising conjugated linoleic acid glycerides with bioactive isomers of cis-9, trans-11.

Example 24

Diet supplement tablet comprised of esterified conjugated glycerides comprising conjugated linoleic acid glycerides with bioactive isomers of cis-9, trans-11 and trans-10, cis-12 unit with inert carrier.

Example 25

Supplemented energy drink comprised of 12 ounces of fruit juice and protein blend and 1.6 grams of esterified conjugated glycerides comprising conjugated linoleic acid glycerides with bioactive isomers of cis-9, trans-11 and trans-10.

Example 26

Bulk esterified conjugated glycerides comprising conjugated linoleic acid glycerides with bioactive isomers of cis-9, trans-11 and trans-10, cis-12 units and further supplemented with 9,11 isomers of CLA glyceride to increase weight percentage of conjugated linoleic acid in 9,11 CLA glyceride form as compared to traditional esterified conjugated glycerides containing conjugated linoleic acid glycerides.

Example 27

Supplemented animal feed comprised of 100:1 ratio of corn meal to esterified conjugated glycerides comprising conjugated linoleic acid glycerides with bioactive isomers of cis-9, trans-11 and trans-10, cis-12 units and further supplemented with 9,11 isomers of CLA glyceride to increase weight percentage of conjugated linoleic acid in 9,11 CLA glyceride form as compared to traditional esterified conjugated glycerides comprising conjugated linoleic acid glycerides.

Example 28

Bulk water emulsion comprised of 100:1 ratio of water to esterified conjugated glycerides comprising conjugated linoleic acid glycerides with bioactive isomers of cis-9, trans-11 and trans-10, cis-12 and further supplemented with 9,11 isomers of CLA glyceride to increase weight percentage of conjugated linoleic acid in 9,11 CLA glyceride form as compared to traditional esterified conjugated glycerides comprising conjugated linoleic acid glycerides.

Example 29

Diet supplement tablet comprised of esterified conjugated glycerides comprising conjugated linoleic acid glycerides with bioactive isomers of cis-9, trans-11 and trans-10, cis-12 unit with inert carrier and further supplemented with 9,11 isomers of CLA glycerides to increase weight percentage of conjugated linoleic acid in 9,11 CLA glyceride form as compared to traditional esterified conjugated glycerides containing conjugated linoleic acid glycerides.

Example 30

Supplemented energy drink comprised of 12 ounces of fruit juice and protein blend and 1.6 grams of esterified conjugated glycerides comprising conjugated linoleic acid glycerides with bioactive isomers of cis-9, trans-11 and trans-10 and further supplemented with 9,11 isomers of CLA glycerides to increase weight percentage of conjugated linoleic acid in 9,11 isomers of CLA glycerides form as compared to traditional esterified conjugated glycerides comprising conjugated linoleic acid glycerides.

Example 31

Bulk esterified conjugated glycerides comprising conjugated linoleic acid glycerides with bioactive isomers of cis-9, trans-11 and trans-10, cis-12 units and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 32

Supplemented animal feed comprised of 100:1 ratio of corn meal to esterified conjugated glycerides comprising conjugated linoleic acid glycerides with bioactive isomers of cis-9, trans-11 and trans-10, cis-12 units and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 33

Bulk water emulsion comprised of 100:1 ratio of water to esterified conjugated glycerides comprising conjugated linoleic acid glycerides with bioactive isomers of cis-9, trans-11 and trans-10, cis-12 and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 34

Diet supplement tablet comprised of esterified conjugated glycerides containing conjugated linoleic acid glycerides with bioactive isomers of cis-9, trans-11 and trans-10, cis-12 unit with inert carrier and further supplemented with 10,12 isomers of CLA glycerides to increase weight percentage of conjugated linoleic acid in 10,12 isomers CLA glycerides form as compared to traditional esterified conjugated glycerides comprising conjugated linoleic acid glycerides.

Example 35

Supplemented energy drink comprised of 12 ounces of fruit juice and protein blend and 1.6 grams of esterified conjugated glycerides comprising conjugated linoleic acid glycerides with bioactive isomers of cis-9, trans-11 and trans-10 and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 36

Bulk isolated conjugated linoleic acid glycerides with bioactive isomers of cis-9, trans-11 and trans-10, cis-12 units from esterified conjugated glycerides comprising conjugated linoleic acid glycerides and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 37

Supplemented animal feed comprised of 100:1 ratio of corn meal to isolated conjugated linoleic acid glycerides with bioactive isomers of cis-9, trans-11 and trans-10, cis-12 units from esterified conjugated glycerides comprising conjugated linoleic acid glycerides and further supplemented with 10,12 isomers of CLA glycerides to increase weight percentage of conjugated linoleic acid in 10,12 isomers of CLA glycerides form as compared to traditional esterified conjugated glycerides comprising conjugated linoleic acid glycerides.

Example 38

Bulk water emulsion comprised of 100:1 ratio of water to conjugated linoleic acid glycerides comprising conjugated linoleic acid triglyceride with bioactive isomers of cis-9, trans-11 and trans-10, cis-12 from esterified conjugated glycerides containing conjugated linoleic acid glycerides and further supplemented with 10,12 isomer of CLA glycerides to increase weight percentage of conjugated linoleic acid in 10,12 isomer of CLA glycerides form as compared to traditional esterified conjugated glycerides comprising conjugated linoleic acid glycerides.

Example 39

Diet supplement tablet comprised of isolated conjugated linoleic acid glycerides with bioactive isomers of cis-9, trans-11 and trans-10, cis-12 unit from esterified conjugated glycerides comprising conjugated linoleic acid glycerides with inert carrier and further supplemented with 10,12 isomer of CLA glycerides to increase weight percentage of conjugated linoleic acid in 10,12 isomer CLA glycerides form as compared to traditional esterified conjugated glycerides comprising conjugated linoleic acid glycerides.

Example 40

Supplemented energy drink comprised of 12 ounces of fruit juice and protein blend and 1.6 grams of isolated conjugated linolcic acid glycerides with bioactive isomers of cis-9, trans-11 and trans-10 from esterified conjugated glycerides comprising conjugated linoleic acid glycerides and further supplemented with 10,12 isomer of CLA glycerides to increase weight percentage of conjugated linoleic acid in 10,12 isomer of CLA glycerides form as compared to traditional esterified conjugated glycerides comprising conjugated linoleic acid glycerides.

Example 41

Diet supplement tablet comprised of 10:1 ratio of conjugated linoleic acid Triglyceride with bioactive isomers of cis-9, trans-11 and trans-10, cis-12 to L-carnitine magnesium citrate.

Example 42

Supplemented energy drink comprised of 12 ounces of fruit juice and protein blend, 1.6 grams of conjugated linoleic acid Triglyceride with bioactive isomers of cis-9, trans-11 and trans-10, cis-12 and 500 milligrams of L-carnitine as a free base.

Example 43

An animal feed supplement is prepared by compounding a 100:1 ratio of corn meal to isomerized vegetable oil comprising conjugated linoleic acid triglyceride with bioactive isomers of cis-9, trans-11 and trans-10, cis-12 units.

Example 44

A bulk water emulsion is prepared by admixing a 100:1 ratio of water to isomerized vegetable oil comprising conjugated linoleic acid triglyceride with bioactive isomers of cis-9, trans-11.

Example 45

A dietary supplement tablet is prepared by compounding isomerized vegetable oil having a bioactive conjugated linoleic acid triglyceride component with bioactive isomers of cis-9, trans-11 and trans-10, cis-12 unit with inert carrier.

Example 46

A nutritional drink is prepared by admixing 12 ounces of a protein enhanced fruit juice with 1.6 grams of isomerized vegetable oil further having conjugated linoleic acid triglyceride with bioactive isomers of cis-9, trans-11 and trans-10.

Example 47

Bulk isomerized vegetable oil comprising conjugated linoleic acid triglyceride with bioactive isomers of cis-9, trans-11 and trans-10, cis-12 units and further supplemented with 9,11 CLA-TG to increase weight percentage of conjugated linoleic acid in 9,11 CLA-TG form as compared to traditional isomerized vegetable oil.

Example 48

Supplemented animal feed comprised of 100:1 ratio of corn meal to isomerized vegetable oil comprising conjugated linoleic acid triglyceride with bioactive isomers of cis-9, trans-11 and trans-10, cis-12 units and further supplemented with 9,11 CLA-TG to increase weight percentage of conjugated linoleic acid in 9,11 CLA-TG form as compared to traditional isomerized vegetable oil.

Example 49

Bulk water emulsion comprised of 100:1 ratio of water to isomerized vegetable oil comprising conjugated linoleic acid triglyceride with bioactive isomers of cis-9, trans-11 and trans-10, cis-12 and further supplemented with 9,11 CLA-TG to increase weight percentage of conjugated linoleic acid in 9,11 CLA-TG form as compared to traditional isomerized vegetable oil.

Example 50

A dietary tablet is compounded of an inert carrier with bioactive conjugated linoleic acid triglyceride with bioactive isomers of cis-9, trans-11 and trans-10, cis-12 unit supplemented with 9,11 CLA-TG to increase weight percentage of conjugated linoleic acid in 9,11 CLA-TG form as compared to traditional isomerized vegetable oil.

Example 51

A nutritional beverage is prepared by admixing 12 ounces of a protein enhanced fruit with 1.6 grams of isomerized vegetable oil having a primary component of bioactive conjugated linoleic acid triglyceride with bioactive isomers of cis-9, trans-11 and trans-10 supplemented with 9,11 CLA-TG to increase weight percentage of conjugated linoleic acid in 9,11 CLA-TG form as compared to traditional isomerized vegetable oil.

While the foregoing examples are illustrative of various embodiments of the invention, those of ordinary skill in the art will understand and appreciate that such examples are non-limiting and that variations in for example, bioactive agent, weight percentages, relative percentages, carriers, isomerization or dehydration reaction conditions are contemplated and included within the scope of the present invention which is limited only by the claims appended hereto.

What is claimed is:

1. A bioactive composition, comprising a conjugated linoleic acid glyceride selected from the group consisting monoglyceride, diglyceride and triglyceride isomers and esters, thereof.

2. The bioactive composition according to claim 1, wherein the conjugated linoleic acid glyceride is derived from at least one of dehydrated castor oil and isomerized vegetable oil.

3. The bioactive composition according to claim 2, wherein the dehydrated castor oil and the isomerized vegetable oil consist essential of isomers of at least one of conjugated linoleic acid monoglyceride, conjugated linoleic acid diglyceride and conjugated linoleic acid triglyceride.

4. The bioactive composition of claim 1 further comprising an L-carnitine component selected from the group of free L-carnitine, L-carnitine L-tartrate, L-carnitine magnesium citrate and acetyl-L-carnitine.

5. The composition of claim 1 consisting essentially of bioactive active isomers of conjugated linoleic acid in at least one of monoglyceride, diglyceride, triglyceride and esterified form.

6. The bioactive composition of claim 5, further comprising an L-carnitine component selected from the group of free L-carnitine, L-carnitine L-tartrate, L-carnitine magnesium citrate and acetyl-L-carnitine.

7. The bioactive composition of claim 1, consisting essentially of bioactive isomers of conjugated linoleic acid monoglyceride derived from at least one glycerine, dehydrated castor oil, esterified conjugated glycerides and isomerized vegetable oil.

8. The bioactive composition of claim 5, further comprising an L-carnitine component selected from the group of free L-carnitine, L-carnitine L-tartrate, L-carnitine magnesium citrate and acetyl-L-carnitine.

9. The bioactive composition of claim 7, consisting essentially of conjugated linoleic acid 2-monoglyceride.

10. The bioactive composition of claim 7, consisting essentially of conjugated linoleic acid triglyceride.

11. A method for producing bioactive conjugated linoleic acid, comprising the steps:

a) dehydrating castor oil yielding dehydration compounds, and;

b) separating bioactive conjugated linoleic acid from the dehydration compounds.

12. The method of claim 11, further comprising the step of compounding L-carnitine with the separated bioactive conjugated linoleic acid.

13. The method of claim 12, further comprising the step of selecting the L-carnitine from the group consisting of free L-carnitine, L-carnitine L-tartrate, L-carnitine magnesium citrate and acetyl-L-carnitine.

14. A method for producing bioactive conjugated linoleic acid comprising the steps of isomerizing vegetable oil, and separating from the isomerized vegetable oil conjugated linoleic acid triglyceride.

15. The method according to claim 14, further comprising the step of selecting the vegetable oil from the group consisting of safflower, soybean, sunflower, fish, corn, perilla and cotton-seed oil.

16. A method for producing bioactive conjugated linoleic acid comprising the steps of esterifying glycerol and separating a desired fraction of conjugated linoleic acid isomer.

* * * * *